US008107094B2

(12) United States Patent
Yamada

(10) Patent No.: US 8,107,094 B2
(45) Date of Patent: Jan. 31, 2012

(54) IMAGE FORMATION CONTROLS IN AN IMAGE FORMING APPARATUS

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1125 days.

(21) Appl. No.: 11/933,606

(22) Filed: Nov. 1, 2007

(65) Prior Publication Data

US 2008/0100860 A1 May 1, 2008

(30) Foreign Application Priority Data

Nov. 1, 2006 (JP) ................................ 2006-297972

(51) Int. Cl.
*G06F 15/00* (2006.01)
*G06F 3/12* (2006.01)
*G06K 1/00* (2006.01)
(52) U.S. Cl. ...................................... 358/1.13; 358/1.15
(58) Field of Classification Search .................. None
See application file for complete search history.

(56) References Cited

U.S. PATENT DOCUMENTS

| 5,066,977 | A | 11/1991 | Yoshizuka |
| 6,088,550 | A | 7/2000 | Asai et al. |
| 6,714,316 | B1 * | 3/2004 | Nishiyama .................. 358/1.18 |
| 2005/0275867 | A1 | 12/2005 | Higashiura et al. |
| 2011/0164282 | A1 * | 7/2011 | Okada et al. ................. 358/1.15 |

FOREIGN PATENT DOCUMENTS

| JP | 03-089258 | 4/1991 |
| JP | 09-146428 | 6/1997 |
| JP | 10-301456 | 11/1998 |
| JP | 2002-258699 | 9/2002 |
| JP | 2003-092649 | 3/2003 |
| JP | 2004-229127 | 8/2004 |
| JP | 2005-242254 | 9/2005 |
| JP | 2005-349702 | 12/2005 |
| JP | 2006-010969 | 1/2006 |

OTHER PUBLICATIONS

Notification of Reasons for Refusal: Patent Application No. P2006-297972, Mailed Oct. 16, 2008.
Decision to Grant a Patent: Japanese Patent Application No. JP2006-297972, Mailed Mar. 19, 2009.

* cited by examiner

*Primary Examiner* — Douglas Tran
(74) *Attorney, Agent, or Firm* — Banner & Witcoff, Ltd.

(57) ABSTRACT

An image forming apparatus is described. The image forming apparatus may be for printing sheets on the basis of a print instruction, including: a printable sheet number storage unit storing the number of printable sheets in association with each of predetermined limit units; a determination unit determining whether or not there is a print instruction exceeding the number of printable sheets for a first limit unit; and a printing authorization unit authorizing execution of printing utilizing the number of printable sheets for a second limit unit stored in the printable sheet number storage unit when the determination unit determines that there is a print instruction exceeding the number of printable sheets for the first limit unit.

17 Claims, 5 Drawing Sheets

FIG. 2

| USER | TYPE | Sun | Mon | Tue | Wed | Thu | Fri | Sat |
|---|---|---|---|---|---|---|---|---|
| A | LIMIT NUMBER | 100 | 80 | 70 | 60 | 50 | 40 | 30 |
| A | CUMULATIVE NUMBER OF IMAGE-FORMED SHEETS | 90 | 0 | 0 | 0 | 0 | 0 | 0 |
| B | LIMIT NUMBER | 160 | 120 | 100 | 100 | 100 | 100 | 100 |
| B | CUMULATIVE NUMBER OF IMAGE-FORMED SHEETS | 160 | 120 | 95 | 0 | 0 | 0 | 0 |
| C | LIMIT NUMBER | 50 | 30 | 10 | 10 | 10 | 10 | 10 |
| C | CUMULATIVE NUMBER OF IMAGE-FORMED SHEETS | 35 | 0 | 0 | 0 | 0 | 0 | 0 |

| USER | TYPE | Sun | Mon | Tue | Wed | Thu | Fri | Sat |
|---|---|---|---|---|---|---|---|---|
| A | LIMIT NUMBER | 100 | 80 | 70 | 60 | 50 | 40 | 30 |
| A | NUMBER OF RESIDUAL PRINTABLE SHEETS | 42 | 80 | 60 | 60 | 50 | 40 | 30 |
| B | LIMIT NUMBER | 160 | 120 | 100 | 100 | 100 | 100 | 100 |
| B | NUMBER OF RESIDUAL PRINTABLE SHEETS | 0 | 0 | 5 | 100 | 100 | 100 | 100 |
| C | LIMIT NUMBER | 50 | 30 | 10 | 10 | 10 | 10 | 10 |
| C | NUMBER OF RESIDUAL PRINTABLE SHEETS | 47 | 30 | 10 | 10 | 10 | 10 | 10 |

21

IMAGE FORMATION CONTROLS IN AN IMAGE FORMING APPARATUS

CROSS REFERENCE TO RELATED APPLICATION

This application claims priority to Japanese Patent Application No. 2006-297972 filed on Nov. 1, 2006, the disclosure of which is hereby incorporated into the present application by reference.

TECHNICAL FIELD

The present invention relates to an image forming apparatus having a function for controlling the number of printed sheets.

BACKGROUND

For an office or the like, there is proposed an image forming apparatus having a so-called department control function for the number of copies, for preventing excess copying when a reserved number of copies set for copying exceeds the number of copiable sheets per department.

When the reserved number of copies exceeds the number of copiable sheets controlled by the department control function per department, this image forming apparatus displays a warning about this excess. After making copies by the number of copiable sheets, the image forming apparatus discards excess image data.

Due to this department control function, the image forming apparatus can prevent copying in excess of the number of copiable sheets previously allocated to each department, whereby the expenses can be saved in each department, and the user can be prompted to refrain from unnecessary copying.

If absolutely necessary image data are discarded when the reserved number of copies exceeds the number of copiable sheets, however, the image forming apparatus is not user-friendly. While all image data may conceivably be copied within the number of copiable sheets by using both surfaces of each copying sheet (a so-called DX (duplex) printing) or by copying image data for a plurality of sheets on a single surface of each sheet in a reduced size (a so-called N-in-1 printing), this may not be desirable for the user.

SUMMARY

One aspect of the present invention may provide an image forming apparatus capable of executing printing in excess of the number of printable sheets if necessary while maintaining an effect of a department control function.

The same or different aspect of the present invention may provide an image forming apparatus printing sheets on the basis of a print instruction, including: a printable sheet number storage unit storing the number of printable sheets in association with each of predetermined limit units;

a determination unit determining whether or not there is a print instruction exceeding the number of printable sheets for a first limit unit; and a printing authorization unit authorizing execution of printing utilizing the number of printable sheets for a second limit unit stored in the printable sheet number storage unit when the determination unit determines that there is a print instruction exceeding the number of printable sheets for the first limit unit.

One or more aspects of the present invention provide an image forming apparatus printing a sheet on the basis of a print instruction, including: a printable sheet number storage unit storing the number of printable sheets in association with each of predetermined limit units; a printed sheet counter unit counting the number of sheets printed in each of the limit units; and a printing authorization unit authorizing, when the print instruction is input in a first limit unit, execution of printing utilizing the number of printable sheets for a second limit unit other than the first limit unit by the number of sheets which should have been continuously printed on the basis of the print instruction after the number of sheets printed in the first limit unit reaches the number of printable sheets for the first limit unit.

BRIEF DESCRIPTION OF THE DRAWINGS

FIG. 2 illustrates an example of a table stored in an EEPROM.

FIG. 5 shows a table according to a modification.

DETAILED DESCRIPTION

Embodiments of one or more aspects of the present invention are now described with reference to the drawings.

First Embodiment

1. Structure of Embodiment

Figure 1:
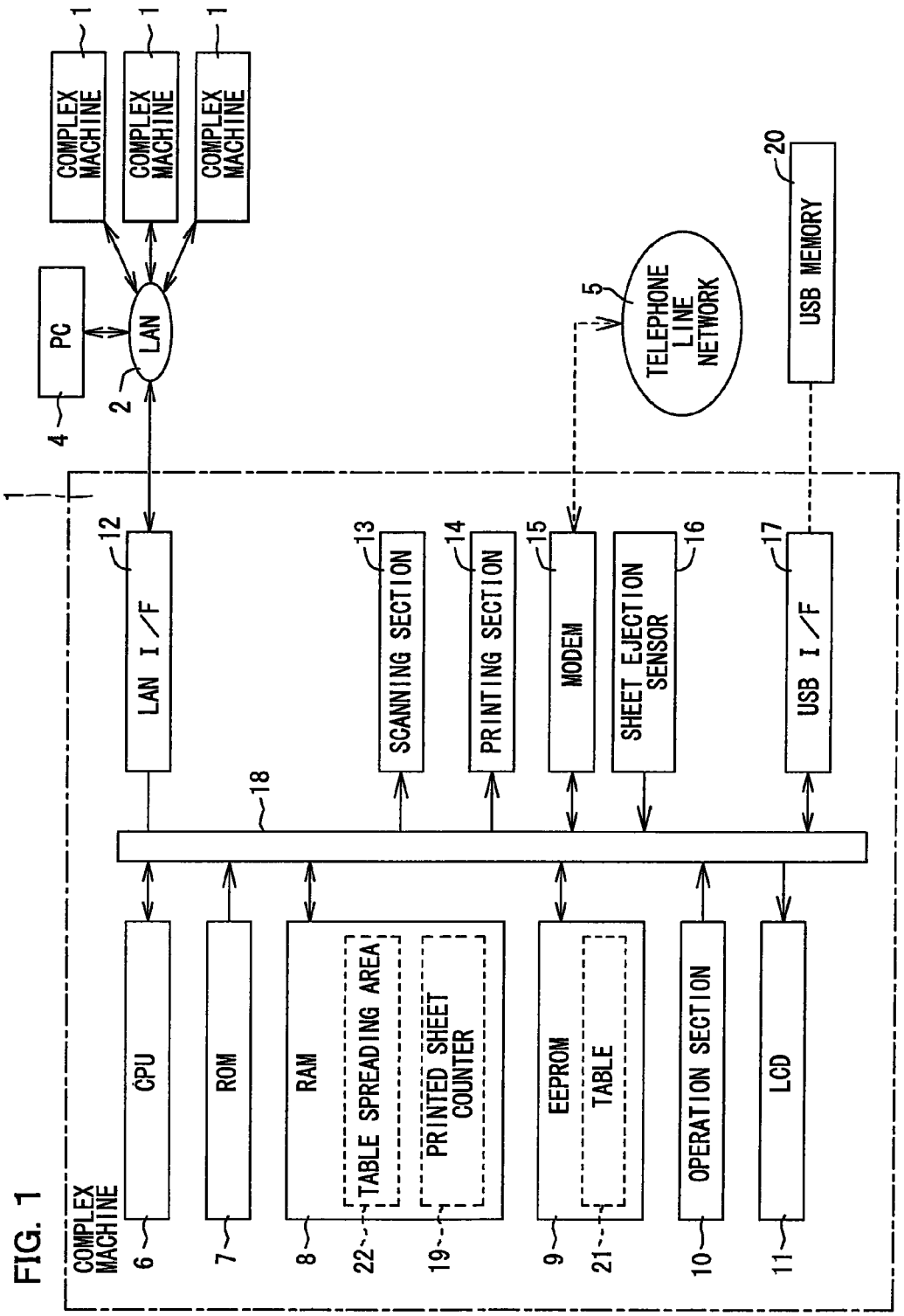
FIG. 1 is a block diagram showing the structure of an image forming system including complex machines as examples of an image forming apparatus of one or more aspects of the present invention.

FIG. 1 is a block diagram showing the structure of an image forming system including complex machines as examples of an image forming apparatus of one or more aspects of the present invention.

This image forming system includes a plurality of complex machines 1 connected to a LAN (local area network) 2 constructed in an office or the like. A personal computer (hereinafter referred to as "PC") 4 for transmitting image data and an image formation (printing) command to each complex machine 1 and making the complex machine 1 execute print processing is connected to the LAN 2.

Each complex machine 1 has a printing function for outputting an image based on the image data received from the PC 4 to each sheet, a copying function for reading a document image and reproducing the document image on the sheet, and a facsimile function for reading a document image and transmitting the data of the read document image to the exterior through a telephone line network 5 and outputting to the sheet an image based on image data transmitted from the exterior through the telephone line network 5.

In order to implement these functions, the complex machine 1 includes a LAN I/F (interface) 12 for connecting the complex machine 1 with the LAN 2, a scanning section 13 optically reading a document image, a printing section 14 outputting image data to the sheet, a modem 15 for connecting the complex machine 1 with the telephone line network 5, and a sheet ejection sensor 16 detecting ejection of each sheet printed in the printing section 14, as well as a CPU 6, a ROM 7, a RAM 8 as a printed sheet counter unit and an EEPROM 9. The CPU 6 functions as a determination unit, a printing authorization unit and an image data writing unit.

The LAN I/F 12, the scanning section 13, the printing section 14, the modem 15, the sheet ejection sensor 16, the CPU 6, the ROM 7, the RAM 8 and the EEPROM 9 are connected with one another through a bus line 18, to be capable of transmitting/receiving data to/from one another.

The ROM 7 stores various control programs etc. executed by the CPU 6.

The RAM 8 is used as a work area for temporarily storing data, a program and the like when the CPU 6 executes any of the control programs. For example, a printed sheet counter 19 for counting the number of sheets whose ejection has been detected by the sheet ejection sensor 16 (number of sheets printed in the printing section 14), a table spreading area 22 for spreading data of a table 21 described later and temporarily holding the same, and the like are set in this RAM 8.

The EEPROM 9 stores the table 21 described later.

An operation section 10 as a specification unit and a setting unit including operation keys etc. operated by the user, and an LCD 11 as a display unit displaying various information such as the operating situation of the complex machine 1 are connected to the bus line 18.

The complex machine 1 further includes a USB port (not shown) for connecting a USB memory 20 as a storage medium to the complex machine 1. The complex machine 1 also includes a USB I/F 17 for connecting the USB memory 20 inserted into the USB port and the bus line 18 with each other.

FIG. 2 illustrates an example of the table 21 stored in the EEPROM 9.

The complex machine 1 has a so-called department control function. The department control function is a function for controlling the number of sheets subjected to image formation (printing) in the complex machine 1 per user (department) in an office or the like, and preventing the user from excessive printing when the number of sheets subjected to image formation exceeds a prescribed limit number.

As shown in FIG. 2, numbers (limit numbers) of sheets printable in a week are allocated to three users A, B and C respectively per day of the week in the table 21 as a printable sheet number storage unit.

In other words, the limit numbers for the user A are set to 100 for Sunday (Sun), 80 for Monday (Mon), 70 for Tuesday (Tue), 60 for Wednesday (Wed), 50 for Thursday (Thu), 40 for Friday (Fri) and 30 for Saturday (Sat) respectively.

The limit numbers for the user B are set to 160 for Sunday, 120 for Monday and 100 for each of Tuesday to Saturday respectively.

The limit numbers for the user C are set to 50 for Sunday, 30 for Monday and 10 for each of Tuesday to Saturday respectively.

Thus, the limit numbers are set corresponding to the users and the days of the week, in consideration of the fact that the frequency of use of the complex machine 1 varies with the user and the day of the week.

The table 21 stores cumulative numbers (cumulative numbers of image-formed sheets) of sheets image-formed (printed) by the users on the respective days in association with the limit numbers. When the user A prints 90 sheets on Sunday, for example, the table 21 stores the number 90 as the cumulative number of image-formed sheets in association with the limit number 100 for the user A for Sunday.

Figure 3:
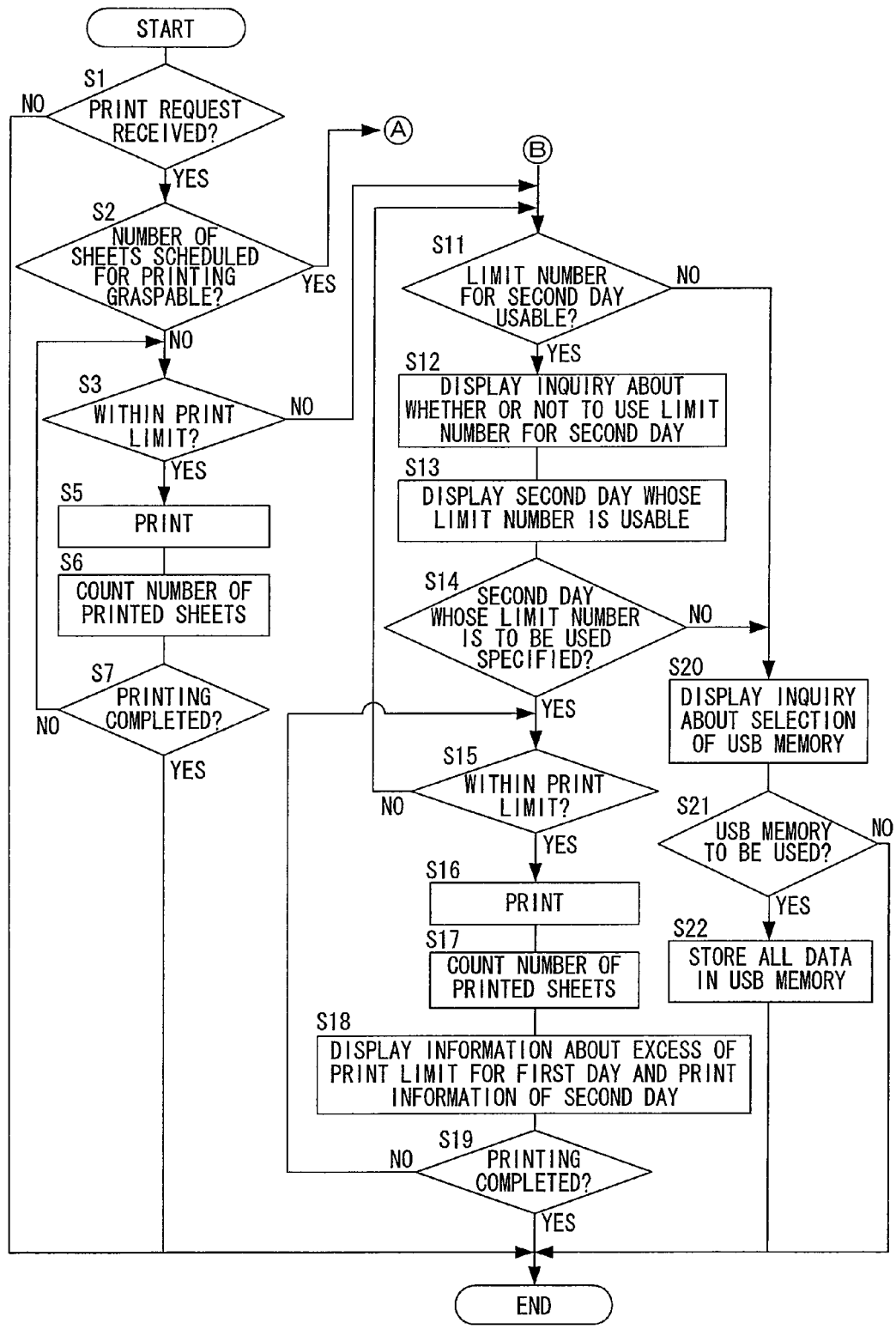
FIG. 3 is a flow chart showing control performed by a department control function.
Figure 4:
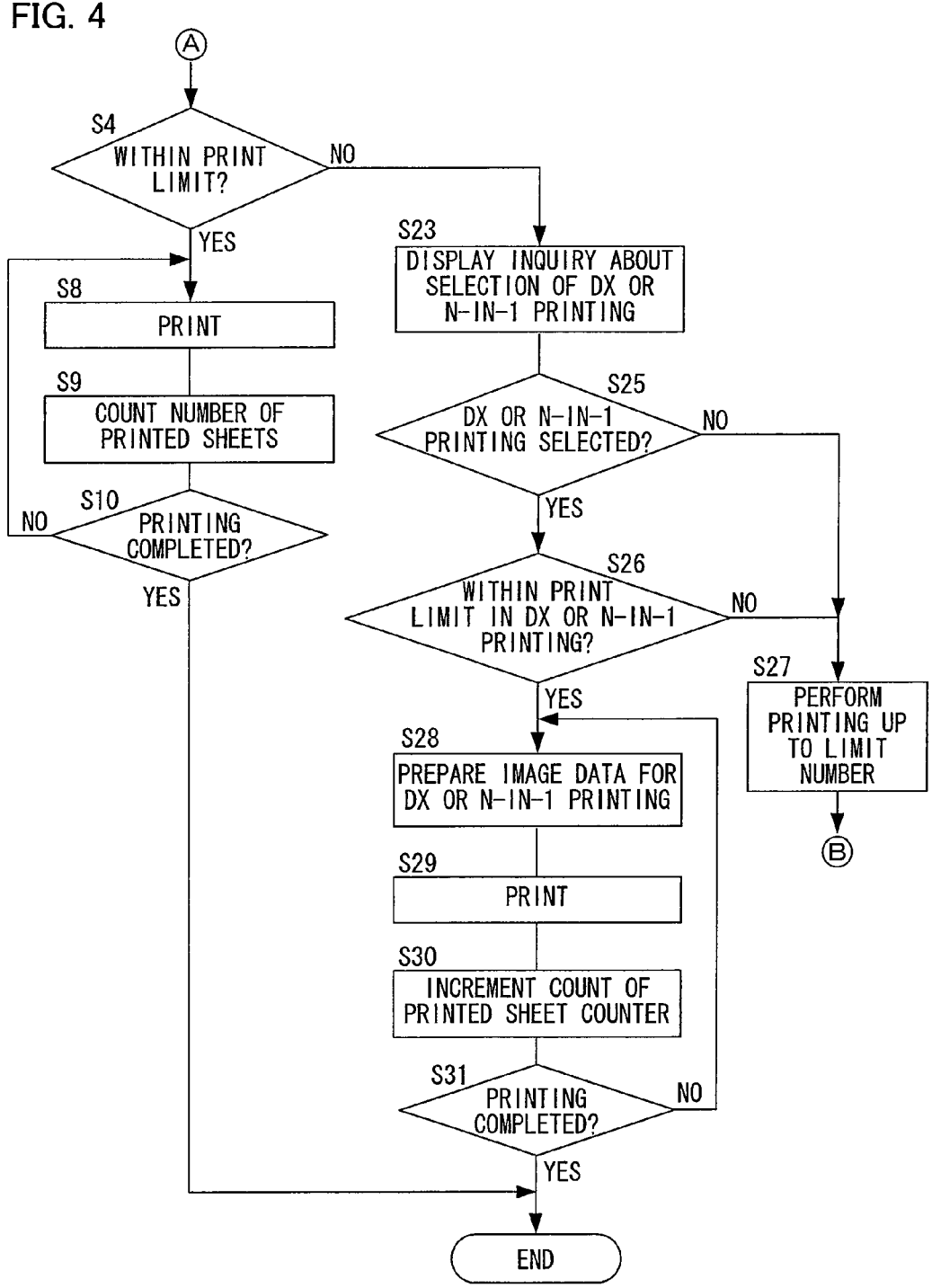
FIG. 4 is a flow chart showing control performed by the department control function.

FIGS. 3 and 4 are flowcharts showing control performed by the department control function.

When any user operates the operation section 10 and inputs an instruction for image formation (may hereinafter be referred to as printing) in the printing section 14, for example, the CPU 6 determines that a print request is received (YES at S1). Alternatively, the print request (instruction command for image formation) may be input from the PC 4 or any other complex machine 1 along with the image data through the LAN 2. The processing described below is not performed unless the print request is received (NO at S1).

When the print request is received, the CPU 6 determines whether or not the number of sheets scheduled for printing (number of sheets to be printed in response to the print request) is graspable (S2). More specifically, the CPU 6 checks whether or not the number of sheets scheduled for printing has been input through the operation section 10, and determines that the number of sheets scheduled for printing is ungraspable if the same has not been input (NO at S2). If the number of sheets scheduled for printing has been input, on the other hand, the CPU 6 determines that the number of sheets scheduled for printing is graspable (YES at S2). If the print request is received from the PC 4 or any other complex machine 1, the CPU 6 may grasp the number of sheets scheduled for printing from data on the number of sheets scheduled for printing received along with the print request, or may spread the image data into bitmap data and grasp the number of sheets scheduled for printing from the bitmap data.

If the number of sheets scheduled for printing is ungraspable (NO at S2), the CPU 6 determines whether or not the print request is within the print limit (S3). More specifically, the CPU 6 moves the table 21 stored in the EEPROM 9 to the table spreading area 22 (see FIG. 1) of the RAM 8, and spreads the data of the table 21 in the table spreading area 22. Then, in the spread table 21 (see FIG. 2), the CPU 6 refers to the limit number set for the user for this day (the first day) and the cumulative number of image-formed sheets for the user on the first day and a count of the printed sheet counter 19, and determines that the print request is within the print limit if the sum of the cumulative number of image-formed sheets and the count of the printed sheet counter 19 is less than the limit number (YES at S3). If the sum of the cumulative number of image-formed sheets and the count of the printed sheet counter 19 reaches the limit number, on the other hand, the CPU 6 determines that the print request is not within the print limit (NO at S3).

If the print request is within the print limit, the CPU 6 makes the printing section 14 execute image formation (printing) on the basis of the image data (S5).

The sheet ejection sensor 16 outputs a pulse signal every time a sheet printed in the printing section 14 is ejected. The CPU 6 increments (+1) the count of the printed sheet counter 19 provided in the RAM 8 in response to the pulse signal output from the sheet ejection sensor 16 (S6). The count of the printed sheet counter 19 has been reset to zero at the time of starting of this processing.

Thereafter the CPU 6 determines whether or not printing is completed, i.e., whether or not printing is performed by the number of sheets scheduled for printing (S7). If printing is not completed, the CPU 6 returns to the step S3, and reexecutes the processing at the steps S5 and S6 if the print request is within the print limit.

When printing is completed (YES at S7), the CPU 6 adds the count of the printed sheet counter 19 to the cumulative number of image-formed sheets held in the table spreading area 22, and holds the resulting sum in the table spreading area 22 as a new cumulative number of image-formed sheets. Then, the CPU 6 rewrites the table 21 stored in the EEPROM 9 on the basis of the updated data held in the table spreading area 22.

If the number of sheets scheduled for printing is graspable (YES at S2), on the other hand, the CPU 6 determines whether or not the print request is within the print limit (S4). In other words, the CPU 6 moves the table 21 stored in the EEPROM 9 to the table spreading area 22 (see FIG. 1) of the RAM 8, and spreads the data of the table 21 in the table spreading area 22. Then, in the spread table 21 (see FIG. 2), the CPU 6 refers to the limit number set for the user for the first day and the cumulative number of image-formed sheets for the user on the first day, and determines that the print request is within the print limit if the sum of the cumulative number of image-formed sheets and the number of sheets scheduled for printing is less than the limit number (YES at S4). If the sum of the cumulative number of image-formed sheets and the number of sheets scheduled for printing reaches the limit number, on the other hand, the CPU 6 determines that the print request is not within the print limit (NO at S4).

If the print request is within the print limit, the CPU 6 makes the printing section 14 execute image formation (printing) on the basis of the image data (S8). The CPU 6 increments (+1) the count of the printed sheet counter 19 provided in the RAM 8 every time the sheet ejection sensor 16 outputs a pulse signal (S9). Unless the printing is completed, the CPU 6 repeats the processing at the steps S8 and S9 (NO at S10).

When the printing is completed (YES at S10), the CPU 6 adds the count of the printed sheet counter 19 to the cumulative number of image-formed sheets held in the table spreading area 22, and holds the resulting sum in the table spreading area 22 as a new cumulative number of image-formed sheets. The CPU 6 rewrites the table 21 stored in the EEPROM 9 on the basis of the updated data held in the table spreading area 22.

If the number of sheets scheduled for printing is ungraspable (NO at S2) and the sum of the cumulative number of image-formed sheets and the count of the printed sheet counter 19 reaches the limit number (NO at S3), the CPU 6 determines whether or not the limit number for another day (second day) is usable (S11). In other words, the CPU 6 refers to the data spread on the table spreading area 22 and checks whether or not there is a day satisfying such a condition that the sum of the cumulative number of image-formed sheets and the count of the printed sheet counter 19 is less than the limit number after the first day on which the print request has been received.

If there is a day satisfying such a condition that the sum of the cumulative number of image-formed sheets and the count of the printed sheet counter 19 is less than the limit number after the first day (the day on which the print request has been received) (YES at S11), the CPU 6 makes the LCD 11 display information indicating that the limit number for the first day is not usable (the print limit is exceeded) and an inquiry about whether or not to perform printing using the limit number for the second day, to inform the user of this situation (S12).

The CPU 6 makes the LCD 11 display the second day whose limit number is usable, and notifies the user of the second day (S13). The user confirming this display operates the operation section 10 and specifies the second day whose limit number is to be used.

When the user specifies the second day whose limit number is to be used (YES at S14) and issues an instruction for performing printing through the limit number of the second day, the CPU 6 determines whether or not the print request is within the print limit for the specified second day (S15). Since this determination as to whether or not the print request is within the print limit is similar to that at the step S3, detailed description of this processing is omitted.

When determining that the print request is within the print limit (YES at S15), the CPU 6 makes the printing section 14 execute image formation (printing) on the basis of the image data (S16). The CPU 6 increments (+1) the count of the printed sheet counter 19 provided in the RAM 8 every time the sheet ejection sensor 16 outputs a pulse signal (S17). Further, the CPU 6 makes the LCD 11 display the second day whose limit number is used for this printing, the limit number for the second day, the number of sheets printed this time and the aforementioned information about the excess of the limit number (S18). At this time, the CPU 6 may set a value obtained by subtracting the count of the printed sheet counter 19 from the limit number for the second day whose limit number is used in this printing, as a new limit number for the second day.

Thereafter the CPU 6 determines whether or not printing is completed, i.e., whether or not printing is performed by the number of sheets scheduled for printing (S19). If the printing is not yet completed, the CPU 6 returns to the step S15, and reexecutes the processing at the steps S16, S17 and S18 if the print request is within the print limit.

When the printing is completed (YES at S19), the CPU 6 adds the count of the printed sheet counter 19 to the cumulative number of image-formed sheets for the second day whose limit number is used in this printing, and holds the resulting sum in the table spreading area 22 as a new cumulative number of image-formed sheets. Then, the CPU 6 rewrites the table 21 stored in the EEPROM 9 on the basis of the updated data held in the table spreading area 22.

On the other hand, when the sum of the cumulative number of image-formed sheets for the second day whose limit number is used in this printing and the count of the printed sheet counter 19 reaches the limit number before the printing is completed (NO at S15), the CPU 6 returns to the step S11 and determines whether or not the limit number for still another day (third day) is usable. If the limit number for the third day is usable, the CPU 6 performs the aforementioned processing subsequent to the step S12.

If the limit number for the third day is not usable (NO at S11) or the user does not specify the day whose limit number is to be used (NO at S14), the CPU 6 makes the LCD 11 display information indicating that printing cannot be performed since neither the limit number for the first day nor the limit number for the second day is usable and an inquiry about whether or not to store the image data for this printing in the USB memory 20 (S20).

If the user operates the operation section 10 and selects storage of the image data in the USB memory 20 (YES at S21), the CPU 6 stores the image data in the USB memory 20 (S22). If the user selects nonuse of the USB memory 20 (NO at S21), on the other hand, the CPU 6 discards the image data and thereafter terminates the control.

When determining that the print request is not within the print limit at the step S4 since the sum of the cumulative number of image-formed sheets and the number of sheets scheduled for printing reaches the limit number (NO at S4), the CPU 6 makes the LCD 11 display information indicating that printing cannot be executed by the number of sheets scheduled for printing in normal printing (printing image data corresponding to a single surface on a single surface of each sheet) and an inquiry about whether or not to print the image data in DX printing or N-in-1 printing (S23).

When the user operates the operation section 10 and selects DX printing or N-in-1 printing of the image data (YES at S25), the CPU 6 determines whether or not printing can be completed within the limit number by DX printing or N-in-1 printing (S26). More specifically, if the user selects DX printing, the CPU 6 compares the sum (hereinafter referred to as a DX sum) of a value (rounded off if not divisible) obtained by dividing the number of sheets scheduled for printing by 2 and the cumulative number of image-formed sheets with the limit number. If the DX sum is less than the limit number, the CPU 6 determines that DX printing is within the print limit (YES at S26). If the user selects N-in-1 printing for printing image data for four sheets on a single surface of each sheet in a reduced size, for example, the CPU 6 compares the sum (hereinafter referred to as an N-in-1 sum) of a value (rounded off if not divisible) obtained by dividing the number of sheets scheduled for printing by 4 and the cumulative number of image-formed sheets with the limit number and determines that N-in-1 printing is within the print limit if the N-in-1 sum is less than the limit number (YES at S26).

When making a positive determination at the step S26, the CPU 6 prepares the image data for DX printing or N-in-1 printing (S28). More specifically, the CPU 6 sorts out image data printed on the front surface of each sheet and that printed on the rear surface of each sheet if the user selects DX printing. If the user selects N-in-1 printing, on the other hand, the CPU 6 sorts out a plurality of image data printed on a single surface of each sheet and sequences the image data.

Then, the CPU 6 makes the printing section 14 execute image formation (printing) on the basis of the thus prepared image data (S29). The CPU 6 increments (+1) the count of the printed sheet counter 19 provided in the RAM 8 every time the sheet ejection sensor 16 outputs a pulse signal (S30). Unless the printing is completed, the CPU 6 repeats the processing at the steps S28 to S30 (NO at S31).

When the printing is completed (YES at S31), the CPU 6 adds the count of the printed sheet counter 19 to the cumulative number of image-formed sheets for the first day held in the table spreading area 22, and holds the resulting sum in the table spreading area 22 as a new cumulative number of image-formed sheets. Then, the CPU 6 rewrites the table 21 stored in the EEPROM 9 on the basis of the updated data held in the table spreading area 22.

If the user selects neither DX printing nor N-in-1 printing of the image data (NO at S25) or printing cannot be completed within the limit number regardless of DX printing or N-in-1 printing (NO at S26), the CPU 6 makes the printing section 14 perform normal printing up to the limit number, thereafter advances to the aforementioned step S11, and executes the processing subsequent to the step S11.

2. Functions and Effects of Embodiment

Thus, the table 21 stores the number of printable sheets as the limit number per predetermined limit unit (day), and when the CPU 6 determines that there is a print instruction exceeding the limit number for the first day, printing is executed using the limit number for the second day by the number of remaining sheets (excess) on the basis of authorization by the CPU 6. More specifically, the printed sheet counter 19 of the RAM 8 first counts the number (print number) of printed sheets. When the print number (more specifically, the cumulative number of image-formed sheets) for the first day reaches the limit number for the first day, the CPU 6 determines that there is a print instruction exceeding the limit number for the first day.

In other words, even if there is a print instruction exceeding the limit number for one limit unit such as the case where the print number for the first day reaches the limit number, printing for the excess can be continuously executed using the limit number for the second day.

Thus, image data corresponding to the excess can be prevented from discard without printing.

However, the excess is printed using the limit number for the second day other than the first day, and the limit number for the first day is not increased corresponding to the excess. In other words, the total limit number in the table 21 remains constant throughout the week, and the limit number for the second day is so utilized as to continuously execute printing by the number exceeding the limit number for the first day. Therefore, printing exceeding the total limit number for the week is limited, whereby the expenses can be saved in each department of an office or the like, and the user can be prompted to refrain from unnecessary copying.

Consequently, printing exceeding limit number can be executed in the complex machine 1 if necessary, while maintaining the effect of the department control function.

Further, not only the number of sheets printed on the first day but also the number of sheets of the second day whose limit number is used for printing the excess can be correctly controlled through the printed sheet counter 19 of the RAM 8.

The table 21 associates the limit number with each day, so that the CPU 6 can immediately acquire information on the limit number for each day with reference to the table 21. If the number of sheets printed on the basis of a printing instruction reaches the limit number for the first day, therefore, the CPU 6 can immediately find a second day whose limit number is usable for printing the excess, and can quickly print the excess.

In advance of the aforementioned authorization by the CPU 6, the user can specify a desirable second day whose limit number is to be used by operating the operation section 10, so that the excess can be printed using the limit number for the desired second day.

After the number of sheets printed on the first day reaches the limit number stored in the table 21 for the first day, the CPU 6 write the data of an image to be formed on each sheet on the basis of the print instruction in the USB memory 20.

When the number of sheets printed on the first day reaches the limit number, therefore, the data of the image is not discarded but stored in the USB memory 20. Therefore, printing can be newly executed on the basis of the print instruction by reading the image data written in the USB memory 20.

When the CPU 6 utilizes the limit number for the second day, the LCD 11 displays the limit number for the second day after the utilization.

When the excess is printed using the limit number for the second day, therefore, the limit number for the second day can be correctly grasped in consideration of the excess.

In advance of the authorization by the CPU 6, further, the user can set whether or not to form images for a plurality of sheets on one sheet (DX printing or N-in-1 printing) by operating the operation section 10. Thus, when the user allows execution of DX printing or N-in-1 printing, printing can be completed only using the limit number for the first day. Or, the excess can be reduced, thereby suppressing utilization of the limit number for the second day.

Second Embodiment

FIG. 5 shows a table 21 according to a modification.

For example, the CPU 6 rewrites the value (a so-called counted-up value) obtained by adding the count of the printed sheet counter 19 to the cumulative number of image-formed (printed) sheets as a new cumulative number of printed sheets without rewriting the limit number when rewriting the table 21 at each of the aforementioned steps S7, S10, S19 and S31, whereby a value obtained by subtracting the cumulative number of image-formed sheets from the limit number corresponds to the number of printable sheets for the next printing. Alternatively, the CPU 6 may rewrite a value (a so-called counted-down value) obtained by subtracting the count of the printed sheet counter 19 from the limit number as a new limit number. In other words, if the limit number is reduced every count by the printed sheet counter 19 during printing, the updated limit number corresponds to the number of image-formable sheets. In this case, the table 21 may not store the cumulative number of image-formed sheets.

More specifically, the table 21 according to the modification stores limit numbers and numbers of residual printable sheets (number of printable sheets) obtained by subtracting the counts of the printed sheet counter 19 from the limit numbers, for the users A, B and C and for the days of the week respectively. For example, the limit number and the number of residual printable sheets for the user A are 100 and 42 for Sunday (Sun) respectively. In other words, it is understood that the user A has printed 58 sheets in the limit number allocated to Sunday (Sun). On the other hand, the numbers of residual printable sheets for the user B are zero for both of Sunday (Sun) and Monday (Mon), whereby it is understood that the user B has performed printing by the total limit numbers on Sunday (Sun) and Monday (Mon).

If the user A continues printing through the number of residual printable sheets for Sunday (Sun), the number of residual printable sheets is decremented from 42. If the number of residual printable sheets reaches zero, the excess image is printed using the number of residual printable sheets for a second day, after Monday (Monday), whose number of residual printable sheets is greater than zero. In this table 21, the numbers of residual printable sheets are important, while the limit numbers themselves may be omitted since the same are stored merely as reference values.

Third Embodiment

While the CPU 6 determines that there is a print instruction exceeding the limit number for the first day when the counted number of printed sheets reaches the limit number in the aforementioned embodiment, the CPU 6 may alternatively determine that there is a print instruction exceeding the limit number before printing if the number of printed sheets is graspable before printing through an instruction for the number of printed sheets or the like.

The embodiments described above are illustrative and explanatory of the invention. The foregoing disclosure is not intended to be precisely followed to limit the present invention. In light of the foregoing description, various modifications and alterations may be made by embodying the invention. The embodiments are selected and described for explaining the essentials and practical application schemes of the present invention which allow those skilled in the art to utilize the present invention in various embodiments and various alterations suitable for anticipated specific use. The scope of the present invention is to be defined by the appended claims and their equivalents.

What is claimed is:

1. An image forming apparatus configured to print on a sheet based on a print instruction, comprising:
a processor; and
memory storing a number of printable sheets in association with each of a plurality of predetermined print limits and storing computer readable instructions that, when executed, cause the image forming apparatus to function as:
a determination unit determining whether there is a print instruction exceeding the number of printable sheets for a first print limit; and
a printing authorization unit authorizing execution of printing utilizing the number of printable sheets for a second print limit stored in the memory when the determination unit determines that there is a print instruction exceeding the number of printable sheets for the first print limit.

2. The image forming apparatus according to claim 1, wherein the computer readable instructions, when executed, further cause the image forming apparatus to function as a printed sheet counter unit counting a number of sheets printed for each of the print limits, wherein
the printed sheet counter unit counts the number of sheets printed utilizing the number of printable sheets for the second print limit when the determination unit determines that there is a print instruction exceeding the number of printable sheets for the first print limit.

3. The image forming apparatus according to claim 1, wherein one or more of the print limits is a period of time.

4. The image forming apparatus according to claim 1, wherein
the memory further stores a table associating each of the print limits with a corresponding number of printable sheets.

5. The image forming apparatus according to claim 1, wherein the computer readable instructions, when executed, further cause the image forming apparatus to function as a specification unit for specifying the second print limit whose number of printable sheets is utilized in advance of authorization by the printing authorization unit.

6. The image forming apparatus according to claim 1, wherein the computer readable instructions, when executed, further cause the image forming apparatus to function as an image data writing unit writing, when the print instruction is input in the first print limit, data of an image to be formed on a sheet based on the print instruction in a prescribed storage medium after the number of sheets printed in the first print limit reaches the number of printable sheets for the first print limit.

7. The image forming apparatus according to claim 1, comprising a display unit displaying, when the printing authorization unit utilizes the number of printable sheets for the second print limit, the number of printable sheets for the second print limit after the utilization.

8. The image forming apparatus according to claim 1, wherein the computer readable instructions, when executed, further cause the image forming apparatus to function as a setting unit for setting whether to form images for a plurality of sheets on a single sheet in advance of authorization by the printing authorization unit.

9. An image forming apparatus configured to print on a sheet based on a print instruction, comprising:
a processor; and
memory storing a number of printable sheets in association with each of a plurality of predetermined print limits and storing computer readable instructions that, when executed, cause the image forming apparatus to function as:
a printed sheet counter unit counting a number of sheets printed for each of the print limits; and
a printing authorization unit authorizing, when the print instruction is input in a first print limit, execution of printing utilizing the number of printable sheets for a second print limit other than the first print limit by the number of sheets which should have been continuously printed based on the print instruction after the number of sheets printed in the first print limit reaches the number of printable sheets for the first print limit.

10. The image forming apparatus according to claim 9, wherein one or more of the plurality of print limits is a time period.

11. The image forming apparatus according to claim 9, wherein
the memory further stores a table associating each of the print limits with a corresponding number of printable sheets.

12. The image forming apparatus according to claim 9, wherein the computer readable instructions, when executed, further cause the image forming apparatus to function as a specification unit for specifying the second print limit whose number of printable sheets is utilized in advance of authorization by the printing authorization unit.

13. The image forming apparatus according to claim 9, wherein the computer readable instructions, when executed, further cause the image forming apparatus to function as an image data writing unit writing, when the print instruction is input in the first print limit, data of an image to be formed on a sheet on the basis of the print instruction in a prescribed storage medium after the number of sheets printed in the first print limit reaches the number of printable sheets for the first print limit.

14. The image forming apparatus according to claim 9, further comprising a display unit displaying, when the printing authorization unit utilizes the number of printable sheets for the second print limit, the number of printable sheets for the second print limit after the utilization.

15. The image forming apparatus according to claim 9, wherein the computer readable instructions, when executed, further cause the image forming apparatus to function as a setting unit for setting whether to form images for a plurality of sheets on a single sheet in advance of authorization by the printing authorization unit.

16. An image forming apparatus configured to print on a sheet based on a print instruction, comprising:
a printable sheet number storage means storing a number of printable sheets in association with each of a plurality of predetermined print limits;
a determination means determining whether there is a print instruction exceeding the number of printable sheets for a first print limit; and
a printing authorization means authorizing execution of printing utilizing the number of printable sheets for a second print limit stored in the printable sheet number storage means when the determination means determines that there is a print instruction exceeding the number of printable sheets for the first print limit.

17. An image forming apparatus configured to print on a sheet based on a print instruction, comprising:
a printable sheet number storage means storing a number of printable sheets in association with each of predetermined print limits;
a printed sheet counter means counting a number of sheets printed for each of the print limits; and
a printing authorization means authorizing, when the print instruction is input in a first print limit, execution of printing utilizing the number of printable sheets for a second print limit other than the first print limit by the number of sheets which should have been continuously printed on the basis of the print instruction after the number of sheets printed in the first print limit reaches the number of printable sheets for the first print limit.

* * * * *